United States Patent
Cho et al.

(10) Patent No.: US 8,825,465 B2
(45) Date of Patent: Sep. 2, 2014

(54) SIMULATION APPARATUS AND METHOD FOR MULTICORE SYSTEM

(75) Inventors: Young-Chul Cho, Yongin-si (KR); Soo-Jung Ryu, Hwaseong-si (KR); Moo-Kyoung Chung, Yongin-si (KR); Ho-Young Kim, Seoul (KR); Woong Seo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 13/171,017

(22) Filed: Jun. 28, 2011

(65) Prior Publication Data

US 2012/0158394 A1 Jun. 21, 2012

(30) Foreign Application Priority Data

Dec. 21, 2010 (KR) ........................ 10-2010-0131628

(51) Int. Cl.
 *G06F 9/44* (2006.01)
 *G06F 17/50* (2006.01)
(52) U.S. Cl.
 CPC ................................. *G06F 17/5009* (2013.01)
 USPC ......................................................... 703/21
(58) Field of Classification Search
 CPC .................................................. G06F 17/5009
 USPC ...................................................... 703/21, 13
 See application file for complete search history.

(56) References Cited

U.S. PATENT DOCUMENTS

| | | | |
|---|---|---|---|
| 6,718,294 B1 * | 4/2004 | Bortfeld | ........................ 703/20 |
| 6,747,964 B1 | 6/2004 | Bender | |
| 7,496,490 B2 * | 2/2009 | Tatsuoka et al. | ................ 703/14 |
| 2007/0094409 A1 | 4/2007 | Crockett et al. | |
| 2007/0294074 A1 * | 12/2007 | Ciolfi | .............................. 703/21 |
| 2010/0324880 A1 * | 12/2010 | Braun et al. | .................... 703/14 |
| 2011/0218795 A1 * | 9/2011 | Cho et al. | ........................ 703/21 |
| 2011/0295587 A1 * | 12/2011 | Eeckhout et al. | ............... 703/21 |

FOREIGN PATENT DOCUMENTS

| | | |
|---|---|---|
| JP | 2008-109327 | 5/2008 |
| KR | 10-2003-0063339 | 7/2003 |
| KR | 10-2008-0059312 | 7/2003 |
| KR | 10-2009-0124566 | 3/2009 |

OTHER PUBLICATIONS

Reinaldo Bergamaschi et. al., "Performance Modeling for Early Analysis of Multi-Core Systems," 2007, 5th IEEE/ACM/IFIP International Conference on Hardware/Software Codesign and System Synthesis, pp. 209-214.*

(Continued)

*Primary Examiner* — Kamini S Shah
*Assistant Examiner* — Russ Guill
(74) *Attorney, Agent, or Firm* — NSIP Law

(57) ABSTRACT

A simulation apparatus and method for a multicore system are provided. The simulation apparatus may prevent the occurrence of a data collision during the communication between modules and may reduce the overhead generated during simulation. The simulation apparatus may select a plurality of modules to be synchronized in terms of function execution timing based on timing information and may configure a multicore system architecture model using the selected modules. The simulation apparatus may acquire function execution timing information of the modules, control the execution of functions by the modules based on the acquired function execution timing information, and output the results of the control of the execution of functions by the modules.

20 Claims, 6 Drawing Sheets

(56) References Cited

OTHER PUBLICATIONS

Roman Plyaskin et al., "High-level timing analysis of concurrent applications on MPSoC platforms using memory-aware trace-driven simulations," Sep. 27, 2010, 18th IEEE/IFIP VLSI System on Chip Conference, pp. 229-234.*

Taewook Oh et al., "Communication Architecture Simulation on the Virtual Synchronization Framework," in Embedded Computer Systems: Architectures, Modeling, and Simulation, editor Stamatis Vassiliadis et al., 2007 Springer-Verlag, pp. 3-12.*

Dohyung Kim et al., "Parallel co-simulation using virtual synchronization with redundant host execution," 2006, Proceedings Design, Automation and Test in Europe 2006, pp. 1151-1156.*

Wei Han et al., "MRPsim: a TLM based simulation tool for MPSocs targeting dynamically reconfigurable processors," 2008, 2008 IEEE International Soc Conference, pp. 41-44.*

* cited by examiner

FIG. 3

```
Class Bundle {
                                              /* DIRECTION */
        unit64_t  reqtime;                    /* MASTER → SLAVE */
        int master_id;                        /* MASTER → SLAVE */
        unit32_t  latency;                    /* MASTER ← SLAVE */
        unit32_t  address32;                  /* MASTER → SLAVE */
        unit64_t  address64;                  /* MASTER → SLAVE */
        int size;                             /* MASTER → SLAVE */
        enum  ResponseType response;          /* MASTER ← SLAVE */
        bool data_is_ptr;                     /* MASTER ↔ SLAVE */
        void *data_ptr;                       /* MASTER ↔ SLAVE */
        int data_val;                         /* MASTER ↔ SLAVE */ unit32_t  data_size _at_a_cycle;      /* MASTER ← SLAVE */
        unit32_t  grant_latency;              /* MASTER ← SLAVE */
        unit32_t  data_ready_latency;         /* MASTER ← SLAVE */
        unit32_t  data_transfer_latency;      /* MASTER ← SLAVE */
        unit32_t  not_ready_latency;          /* MASTER ← SLAVE */
    }
```

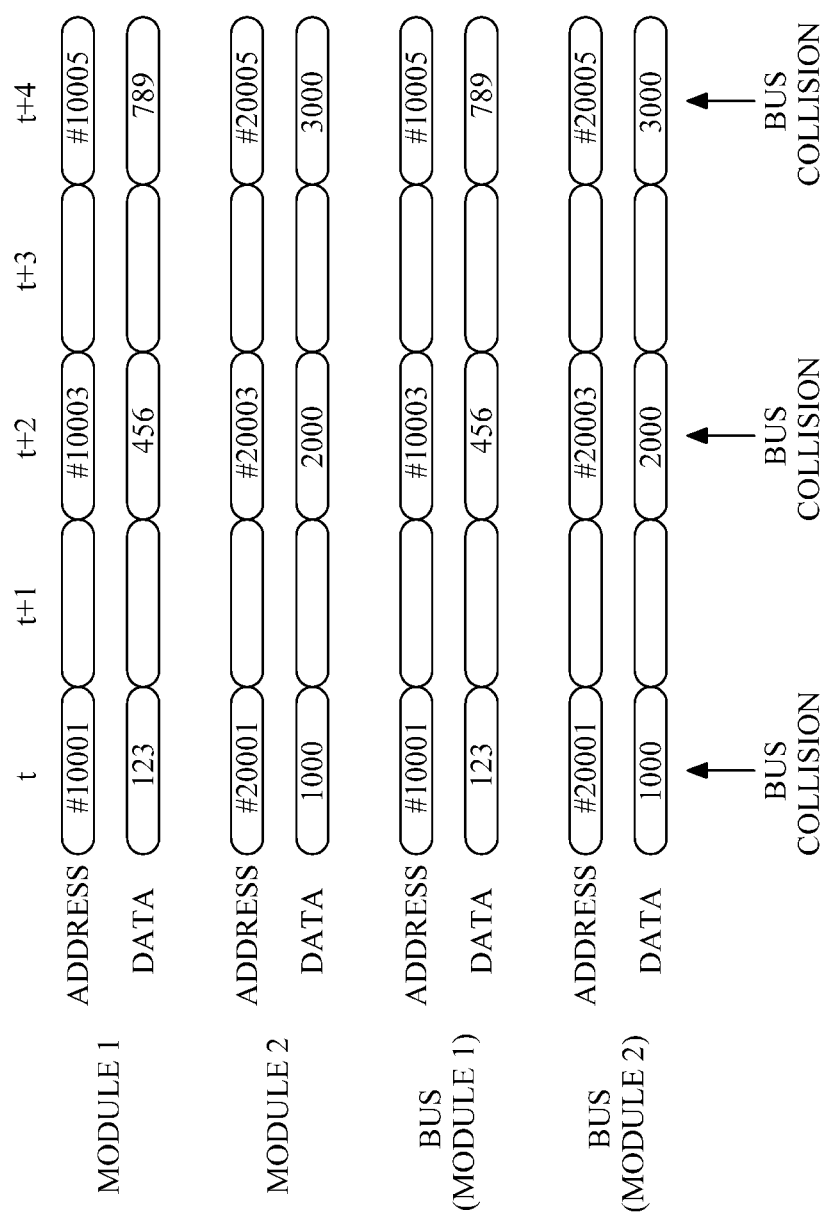

SIMULATION APPARATUS AND METHOD FOR MULTICORE SYSTEM

CROSS-REFERENCE TO RELATED APPLICATION(S)

This application claims the benefit under 35 U.S.C. §119 (a) of Korean Patent Application No. 10-2010-0131628, filed on Dec. 21, 2010, in the Korean Intellectual Property Office, the entire disclosure of which is incorporated herein by reference for all purposes.

BACKGROUND

1. Field

The following description relates to a simulation apparatus and method for a multicore system, and in addition, to a simulation apparatus and method for a multicore system that uses timing information of modules in the multicore system.

2. Description of the Related Art

Multicore systems are equipped with two or more processing cores that are capable of processing one or more tasks in parallel. The performance of a multicore system can be improved by appropriately distributing tasks between a plurality of processing cores in an effort to handle applications suitable for parallel processing. Multicore systems can deliver better performance at lower costs through parallel processing in comparison to single-core systems.

However, multicore systems generally need more components such as processing cores, memories, direct memory access controllers (DMAC), interrupt controllers (ITCs), timers, and the like, in comparison to the single-core systems. Accordingly, the connections between components are typically more complicated in a multicore system than in a single-core system. Based on the architecture of a multicore system it is possible to improve the performance of the multicore system and reduce the power consumption of multicore system.

To simulate different multicore architectures and evaluate the performance of different multicore architectures, components and communication architectures of each multicore architecture may be implemented as modules. The modules may be used to facilitate the reconfiguration of each multicore architecture and the modification of parameters (such as memory capacity). In addition, appropriate processing techniques may be required to properly transmit data and control signals between the modules.

Conventional module-based multicore simulators perform a function call using buses or signal protocols to handle the communication between modules. However, repeated function calls for each module may incur a considerable amount of simulation overhead which can reduce the overall system efficiency.

SUMMARY

In one general aspect, there is provided a simulation apparatus for a multicore system, the simulation apparatus including an architecture configuration unit configured to select a plurality of modules to be synchronized in terms of function execution timing based on timing information included in bundle data, and configured to configure a multicore system architecture model using the selected modules, and a simulation engine unit configured to acquire function execution timing information of the modules, control the execution of functions by the modules based on the acquired function execution timing information, and output the results of the control of the execution of functions by the modules.

The simulation apparatus may further comprise a trace generation unit configured to generate a trace corresponding to function execution information of the modules.

The timing information may comprise request time information of a module transmitting data and latency information of a module receiving the data.

The modules may comprise at least one master module and at least one slave module.

The at least one master module may comprise a data generator configured to generate the bundle data including the timing information, a master interface configured to transmit the bundle data to another module, and a time synchronizer configured to synchronize the function execution time of the at least one master module with a simulation time of the simulation engine unit.

The at least one slave module may comprise a slave interface configured to receive the bundle data from the at least one master module, a data storage configured to store the bundle data, and a controller configured to control the function execution time of the at least one slave module based on the timing information of the bundle data.

The at least one slave module may further comprise an address decoder configured to decode destination address information that is included in the bundle data.

In another aspect, there is provided a simulation method for a multicore system, the simulation method including selecting a plurality of modules to be synchronized in terms of function execution timing based on timing information of bundle data, generating a multicore system architecture model using the selected modules, acquiring function execution timing information of the modules, controlling the execution of functions by the modules based on the acquired function execution timing information, and outputting the results of the execution of functions by the modules.

The simulation method may further comprise generating a trace corresponding to function execution information of the modules.

The timing information may comprise request time information of a module transmitting data and latency information of a module receiving the data.

The modules may comprise at least one master module and at least one slave module.

The at least one master module may comprise a data generator configured to generate the bundle data including the timing information, a master interface configured to transmit the bundle data to another module, and a time synchronizer configured to synchronize the function execution time of the at least one master module with a simulation time of the simulation engine unit.

The at least one slave module may comprise a slave interface configured to receive the bundle data from the at least one master module, a data storage configured to store the bundle data, and a controller configured to control the function execution time of the at least one slave module based on the timing information of the bundle data.

The at least one slave module may acquire destination address information included in the bundle data and, if the acquired destination address information includes an address of another module, the at least one slave module may transmit the bundle data to the module corresponding to the address included in the acquired destination address information.

In another aspect, there is provided a module-based multicore simulator for a multicore processor, the module-based simulator including a master module configured to receive a function call from a simulation engine, configured to determine the execution time of each module of the multicore simulator based on simulation time information received from the simulation engine, and configured to generate bundle data comprising timing information, and at least one slave module configured to analyze the bundle data including the timing information generated by the master module and configured to execute an instruction of the at least one slave module at a time specified in the timing information.

The master module may be configured to transmit a pointer of the bundle data to the at least one slave module, and the at least one slave module may be configured to analyze the bundle data including the timing information based on the pointer received from the master module.

The master module may comprise a data generator configured to generate the bundle data including the timing information, a master interface configured to transmit the bundle data to the at least one slave module, and a time synchronizer configured to synchronize the function execution time of the master module with a simulation time of the simulation engine.

Each of the at least one slave modules may comprise a slave interface configured to receive the bundle data from the master module and/or one or more other slave modules, a data storage configured to store the bundle data, and a controller configured to control the function execution time of the slave module based on the timing information of the bundle data.

Other features and aspects may be apparent from the following detailed description, the drawings, and the claims.

BRIEF DESCRIPTION OF THE DRAWINGS

FIG. 3 is a diagram illustrating an example of bundle data including timing information.

FIG. 4A is a diagram illustrating an example of the occurrence of a bus collision between modules.

Figure 1:
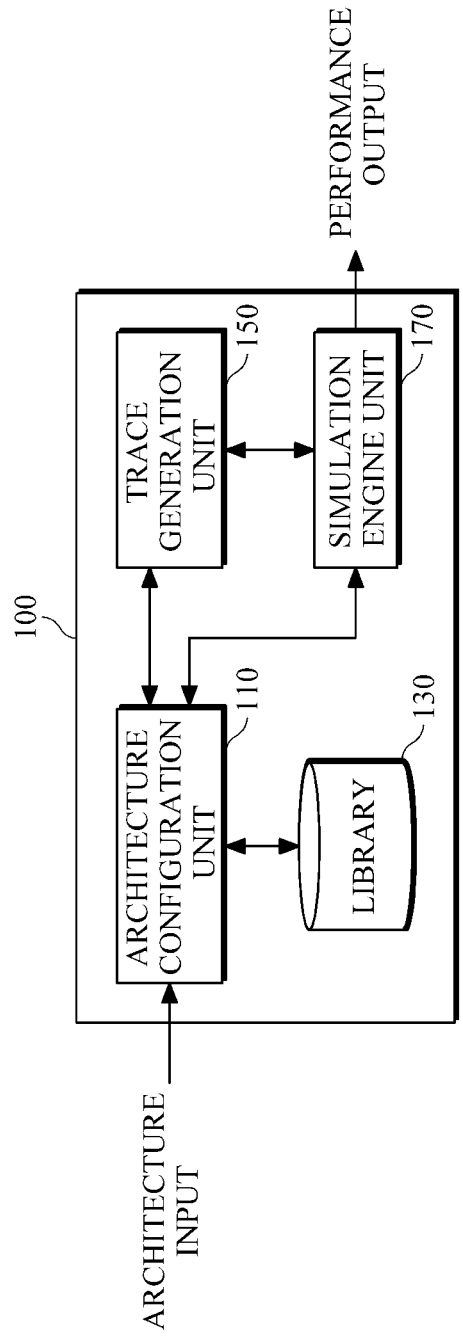
FIG. 1 is a diagram illustrating an example of a simulation apparatus for a multicore system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a simulation apparatus for a multicore system. The simulation apparatus may be included in a device for processing data, for example, a processor, a computer, a mobile terminal, a smart phone, a laptop computer, a personal digital assistant, a tablet, an MP3 player, and the like.

Referring to FIG. 1, simulation apparatus 100 includes an architecture configuration unit 110, a library 130, a trace generation unit 150, and a simulation engine unit 170. The architecture configuration unit 110 may receive data that corresponds to the architecture of a multicore system, and may select one or more components that constitute the architecture of the multicore system from the library 130. The architecture configuration unit 110 may configure a model (hereinafter referred to as the multicore system architecture model) for the architecture of the multicore system by arranging the selected components. For example, the apparatus 100 may be a module-based multicore simulator, and components and communication architectures may be stored in the library 130 as modules. Accordingly, it is possible to easily reconfigure a multicore architecture using the modules.

Various types of components that can be used in the multicore system may be stored in the library 130 in a compiled state. Each component stored in the library 130 may be readily instanced in response to a signal being received from the architecture configuration unit 110. The types of components that can be stored in the library 130 may be set in advance. Information corresponding to each of the components stored in the library 130 may also be stored in the library 130. For example, for an RP core that includes a direct memory access controller (DMAC), a configuration memory, a cache, and an interface, the power consumptions and data processing speeds of the DMAC, the configuration memory, the cache, and the interface may be stored in the library 130.

As described herein, components and communication architectures may be stored in the library 130 as modules. The modules may include a master module that has a master interface, a slave module that has a slave interface, and/or a module that has both the master and slave interfaces. In a module-based multicore simulator, modules may transmit/receive data or control signals to/from one another via their interfaces. The structure of master and slave modules is further described with reference to FIG. 2.

The simulation engine unit 170 may acquire timing information of the execution of functions of a plurality of modules of the multicore system architecture model. The simulation engine unit 170 may control the execution of functions by the modules and may output the results of the control. The simulation engine unit 170 may simulate the multicore system architecture model. In this example, the simulation of the multicore system architecture model may be performed to determine, for example, the power consumption and data processing speed of the multicore system. The simulation engine unit 170 may output the results of the simulation of the multicore system architecture model. For example, the results of the simulation of the multicore system architecture model may include numeric data corresponding to the power consumption and data processing speed of the multicore system.

The trace generation unit 150 may generate a trace corresponding to the execution of functions by the modules of the multicore system architecture model. To determine whether a target routine currently being executed in each of the modules of the multicore system architecture model is operating properly, the trace generation unit 150 may print out an instruction of the target routine, the address of the instruction, and the content of each register at a time immediately after the execution of the instruction each time the instruction is executed. As another example, the trace generation unit 150 may print out the instruction, the address, and the content, in response to a jump instruction or a particular instruction being executed.

Figure 2:
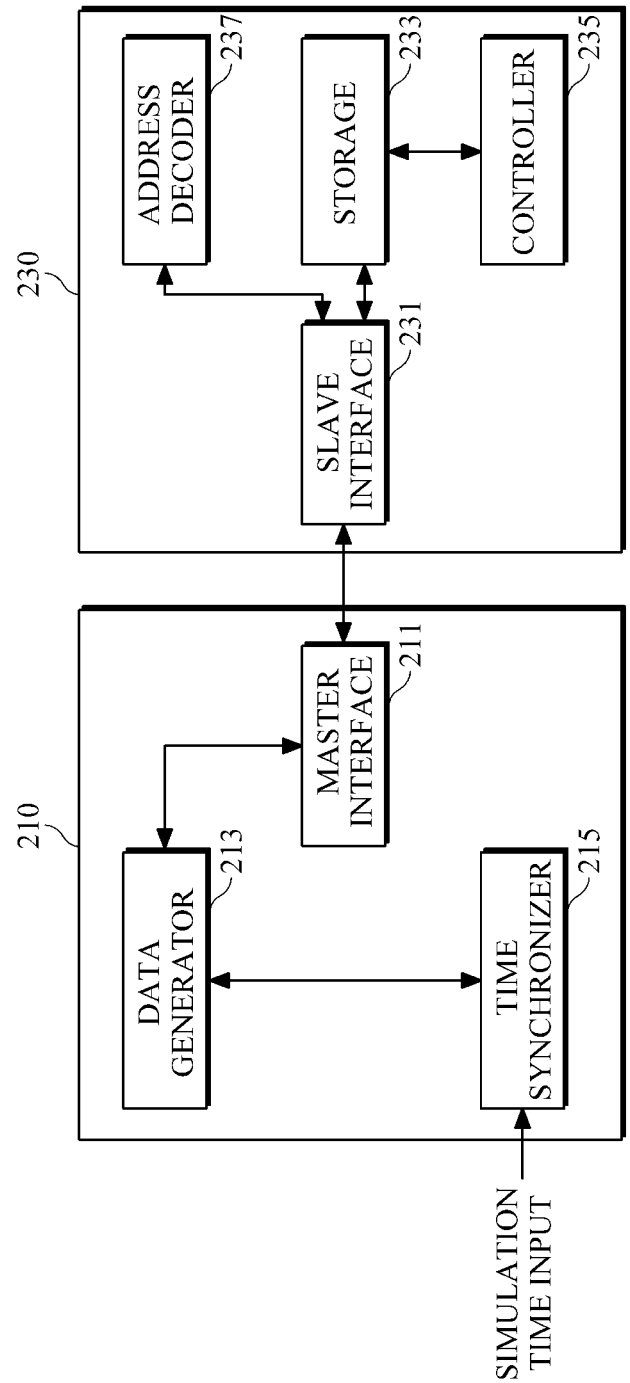
FIG. 2 is a diagram illustrating an example of a master module and a slave module.

FIG. 2 illustrates an example of a master module and a slave module.

Referring to FIG. 2, master module 210 includes a master interface 211, a data generator 213, and a time synchronizer 215. The master interface 211 is an interface for transmitting data and/or control signals to another module. The data and/or control signals may be generated in the master module 210. The master module 210 may communicate with other modules, for example, another master module or a slave module 230 via the master interface 211. An instruction for executing a function via the master interface 211 may be stored in the trace generation unit 150 that is shown in FIG. 1. The master interface 211 may receive a function call signal from a simulation engine and may transmit an operation instruction for a function that corresponds to the received function call signal.

The data generator 213 may generate bundle data. The bundle data may include timing information. For example, the timing information may include request time information corresponding to a transmitter module and response time information corresponding to a receiver module. The bundle data may include signal information such as an address, a read/write, a response, data size, and the like. The bundle data may include timing information such as request time and latency. The timing information included in the bundle data may prevent a bus collision from occurring during the communication between modules and may provide precise simulation results. The structure of the bundle data is further described with reference to FIG. 3.

FIG. 3 illustrates an example of bundle data including timing information.

Referring to FIG. 3, bundle data for the communication between modules may be written in various programming languages, for example, a C++ language. Bundle data including request time information and latency information may be transmitted between a master module 'unit 64' and a slave module 'unit 32.' Data may also be transmitted between the master module 'unit 64' and the slave module 'unit 32' via various pointers, for example, pointers 'address32' and 'address64.' The master module 'unit 64' may provide data to the slave module 'unit 32' and the slave module 'unit 32' may process the data provided by the master module 'unit 64.'

Conventionally, for the communication between modules, buses or signal protocols are implemented individually through a function call. In various aspects described herein, it is possible to considerably reduce overhead during the communication between modules by using bundle data including timing information.

For example, a module that has generated bundle data may transmit the bundle data to a module that is supposed to process the bundle data only through one or more other modules. In this example, the communication overhead may be reduced by transmitting the pointer of the bundle data to each of the intermediate modules. That is, due to the use of the bundle data in this example, including timing information, there is no need to perform a function call for each of the intermediate functions.

Referring again to FIGS. 1 and 2, the time synchronizer 215 may synchronize the function execution time of the master module 210 with the simulation time of the simulation engine unit 170. The simulation engine unit 170 may provide the master module 210 with simulation time information for each of the modules of the multicore system architecture model. The time synchronizer 215 of the master module 210 may determine the function execution time of each module of the multicore system architecture model by analyzing the simulation time information. The time synchronizer 215 may synchronize the modules of the multicore system architecture model with one another in terms of function execution time, based on the simulation time information. For example, the time synchronizer 215 may be connected to the data generator 213, and may control the data generator 213 to generate bundle data based on the simulation time information.

Referring again to FIG. 2, the slave module 230 includes a slave interface 231, storage 233, a controller 235, and an address decoder 237. The slave interface 231 allows the slave module 230 to exchange data with another module. Data transmitted or received via the slave interface 231 may be stored in the storage 233. The storage 233 may store bundle data that is generated by the master module 210. The controller 235 may analyze the timing information of the bundle data and may control the function execution time of the slave module 230. The address decoder 237 may be connected to the slave interface 231 and may identify a final destination address of the bundle data. For example, if the slave module 230 is not the final destination address of the bundle data, the address decoder 237 may transmit the bundle data to a module that corresponds to the final destination address of the bundle data. As a result, a trace may be generated by the trace generation unit 150 shown in FIG. 1.

The simulation engine unit 170 shown in FIG. 1 may not directly call the slave module 230 that includes the slave interface 231. That is, because of the use of the bundle data including timing information, the simulation engine unit 170 may perform a function call for only the master module 210. This is different from conventional simulation in which a function call needs to be performed for all modules during the simulation of the modules. The slave module 230 may execute an instruction at a request time that is specified in the bundle data provided by the master module 210.

Figure 4B:
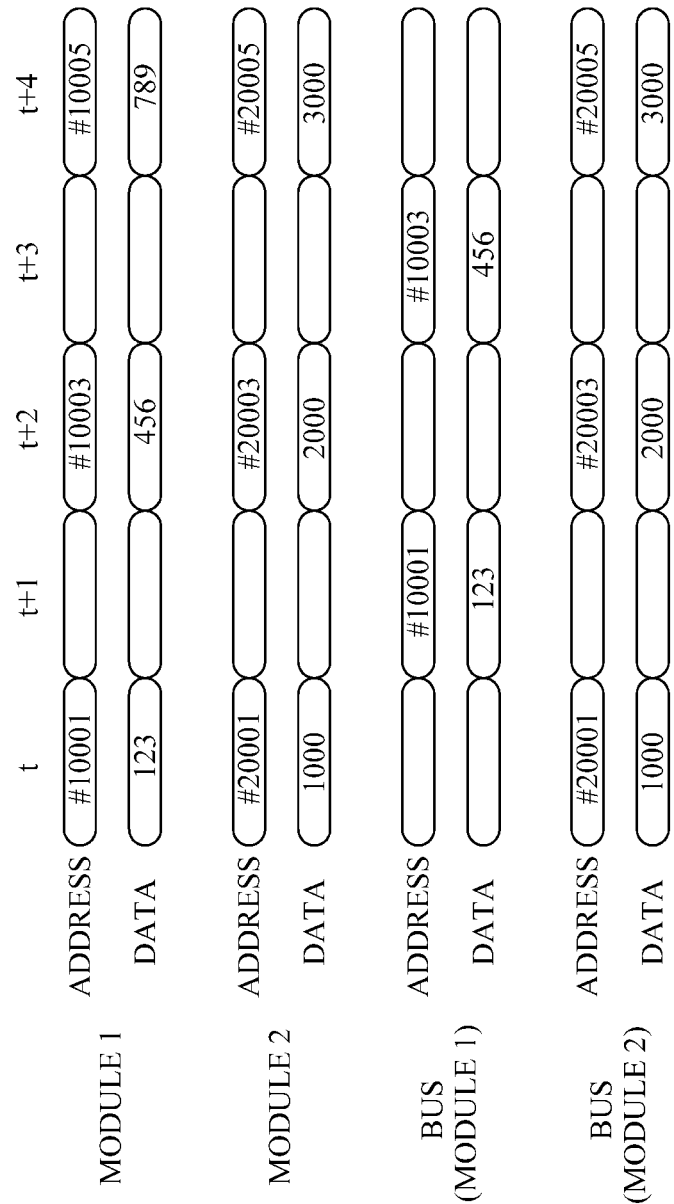
FIG. 4B is a diagram illustrating an example of the prevention of a bus collision through the synchronization of the function execution times of modules.

FIG. 4A illustrates an example of the occurrence of a bus collision between modules, and FIG. 4B illustrates an example of the prevention of the occurrence of a bus collision between modules.

Referring to FIG. 4A, during the communication of data between modules 1 and 2, a collision occurs between a bus that processes data for module 1 and a bus that processes data for module 2. To prevent a collision between the buses, the function execution timing of modules 1 and 2 may be adjusted. For example, if a bus collision occurs during the execution of functions by modules 1 and 2 as part of a simulation process, the function execution time of one of modules 1 and 2 may be adjusted. Accordingly, it is possible to prevent the occurrence of a bus collision between modules 1 and 2 by using bundle data including timing information corresponding to the execution of functions by modules 1 and 2.

Referring to FIG. 4B, modules 1 and 2 may exchange timing information that includes request time information and latency information. In this example, the function execution times of modules 1 and 2 may be synchronized with each other based on the request time information. For example, the function execution times of modules 1 and 2 may be synchronized by delaying a function call for module 1 or by advancing a function call for module 2. As a result, it is possible to prevent the occurrence of a bus collision between modules 1 and 2 during a simulation process.

Figure 5:
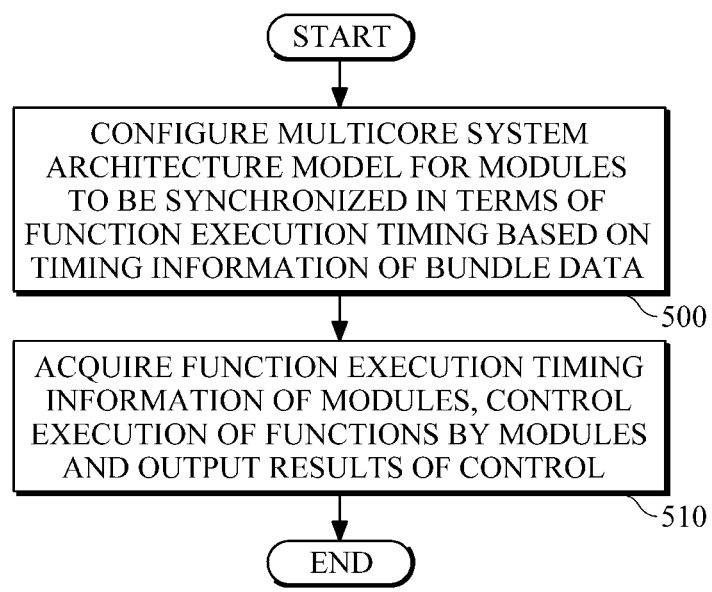
FIG. 5 is a flowchart illustrating an example of a simulation method for a multicore system.

FIG. 5 illustrates an example of a simulation method for a multicore system.

Referring to FIG. 5, a plurality of modules to be synchronized in terms of function execution timing are selected from a library, and a multicore system architecture model is configured using the selected model (500). The plurality of modules may be synchronized based on timing information of bundle data. The bundle data may include request time information of a module transmitting data and latency information of a module receiving the data. The modules that constitute a multicore system may include one or more master modules that have a master interface and one or more slave modules that have a slave interface.

The master modules may generate bundle data including timing information and may transmit the bundle data to other modules via the master interface. During a simulation process, the function execution times of the master modules may be synchronized. The slave modules receive the bundle data from the master modules. The function execution times of the slave modules may be controlled using the timing information of the bundle data. The slave modules may acquire a destination address of the bundle data. If the destination address of the bundle data specifies modules other than the slave modules, the slave modules may transmit the bundle data to the modules specified by the destination address of the bundle data.

Referring again to FIG. 5, the function execution timing information of each of the modules of the multicore system architecture model is acquired, the execution of functions by the modules is controlled based on the acquired function execution timing information, and the results of the control are output (510). A trace information corresponding to function execution information of the modules of the multicore system architecture model may be configured. Accordingly, it is possible to easily identify function execution information of each of the modules of the multicore system architecture model from the trace.

As described herein, it is possible to prevent the occurrence of a data collision during the communication between modules of a multicore system and minimize the overhead of simulation by synchronizing the function execution times of the modules.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A simulation apparatus for a multicore system, the simulation apparatus comprising:
a processing device;
an architecture configuration unit configured to select a plurality of modules, to be synchronized in terms of function execution timing, based on timing information included in bundle data, and to configure a multicore system architecture model using the selected modules; and
a simulation engine unit configured to acquire function execution timing information of the modules, synchronize the execution of functions by the modules based on the acquired function execution timing information, and output results of the synchronization of the execution of functions by the modules,
wherein the modules comprise at least one master module which is configured to generate the bundle data and transmit the bundle data to another module.

2. The simulation apparatus of claim 1, further comprising:
a trace generation unit configured to generate a trace corresponding to function execution information of the modules.

3. The simulation apparatus of claim 1, wherein the timing information comprises request time information of a module transmitting data and latency information of a module receiving the data.

4. The simulation apparatus of claim 1, wherein the modules further comprise at least one slave module.

5. The simulation apparatus of claim 4, wherein the at least one slave module comprises:
a slave interface configured to receive the bundle data from the at least one master module;
a data storage configured to store the bundle data; and a controller configured to control the function execution time of the at least one slave module based on the timing information of the bundle data.

6. The simulation apparatus of claim 5, wherein the at least one slave module further comprises an address decoder configured to decode destination address information that is included in the bundle data.

7. The simulation apparatus of claim 1, wherein the at least one master module comprises:
   a data generator configured to generate the bundle data including the timing information;
   a master interface configured to transmit the bundle data to another module; and
   a time synchronizer configured to synchronize the function execution time of the at least one master module with a simulation time of the simulation engine unit.

8. The simulation apparatus of claim 1, wherein the simulation engine adjusts a time at which a module is scheduled to execute a function based on the acquired function execution timing information.

9. The simulation apparatus of claim 1, wherein the simulation engine adjusts a time at which a module is scheduled to execute a function by delaying a function call for the module or by advancing the function call for the module, based on the acquired function execution timing information.

10. A simulation method for a multicore system, the simulation method comprising:
    selecting a plurality of modules to be synchronized in terms of function execution timing based on timing information of bundle data;
    generating a multicore system architecture model using the selected modules;
    acquiring function execution timing information of the modules;
    synchronizing the execution of functions by the modules based on the acquired function execution timing information; and
    outputting results of the synchronization of functions by the modules,
    wherein the modules comprise at least one master module which is configured to generate the bundle data and transmit the bundle data to another module.

11. The simulation method of claim 10, further comprising:
    generating a trace corresponding to function execution information of the modules.

12. The simulation method of claim 10, wherein the timing information comprises request time information of a module transmitting data and latency information of a module receiving the data.

13. The simulation method of claim 10, wherein the modules further comprise at least one slave module.

14. The method of claim 13, wherein the at least one slave module comprises:
    a slave interface configured to receive the bundle data from the at least one master module;
    a data storage configured to store the bundle data; and
    a controller configured to control the function execution time of the at least one slave module based on the timing information of the bundle data.

15. The method of claim 14, wherein the at least one slave module acquires destination address information included in the bundle data and, if the acquired destination address information includes an address of another module, the at least one slave module transmits the bundle data to the module corresponding to the address included in the acquired destination address information.

16. The simulation method of claim 10, wherein the at least one master module comprises:
    a data generator configured to generate the bundle data including the timing information;
    a master interface configured to transmit the bundle data to another module; and
    a time synchronizer configured to synchronize the function execution time of the at least one master module with a simulation time of a simulation engine unit.

17. A module-based multicore simulator for a multicore processor, the module-based simulator comprising:
    a processing device;
    a master module configured to receive simulation time information and a function call from a simulation engine, configured to the synchronize a function execution time based on the simulation time information, generate bundle data comprising timing information, and transmit the bundle data to another module; and
    at least one slave module configured to analyze the bundle data including the timing information generated by the master module and configured to execute an instruction of the at least one slave module at a time specified in the timing information.

18. The module-based multicore simulator of claim 17, wherein the master module is configured to transmit a pointer of the bundle data to the at least one slave module, and the at least one slave module is configured to analyze the bundle data including the timing information based on the pointer received from the master module.

19. The module-based multicore simulator of claim 17, wherein the master module comprises:
    a data generator configured to generate the bundle data including the timing information;
    a master interface configured to transmit the bundle data to the at least one slave module; and
    a time synchronizer configured to synchronize the function execution time of the master module with a simulation time of the simulation engine.

20. The module-based multicore simulator of claim 17, wherein each of the at least one slave modules comprise:
    a slave interface configured to receive the bundle data from the master module and/or one or more other slave modules;
    a data storage configured to store the bundle data; and
    a controller configured to control the function execution time of the slave module based on the timing information of the bundle data.

* * * * *